(12) United States Patent
Sakala et al.

(10) Patent No.: US 10,815,804 B2
(45) Date of Patent: Oct. 27, 2020

(54) TURBINE ENGINE CONTAINMENT ASSEMBLY AND METHOD FOR MANUFACTURING THE SAME

(71) Applicant: GENERAL ELECTRIC COMPANY, Schenectady, NY (US)

(72) Inventors: Viswanadha Gupta Sakala, Karnataka (IN); Mitchell Harold Boyer, Cincinnati, OH (US); Ming Xie, Beavercreek, OH (US); Douglas Duane Ward, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 524 days.

(21) Appl. No.: 15/478,702

(22) Filed: Apr. 4, 2017

(65) Prior Publication Data
US 2018/0283397 A1 Oct. 4, 2018

(51) Int. Cl.
*F01D 9/04* (2006.01)
*F04D 29/54* (2006.01)
*F01D 25/24* (2006.01)
*F01D 5/28* (2006.01)

(52) U.S. Cl.
CPC ............. *F01D 9/042* (2013.01); *F01D 5/282* (2013.01); *F01D 9/041* (2013.01); *F01D 25/243* (2013.01); *F01D 25/246* (2013.01); *F04D 29/54* (2013.01); *F04D 29/542* (2013.01); *F05D 2220/32* (2013.01); *F05D 2230/10* (2013.01); *F05D 2230/60* (2013.01); *F05D 2300/10* (2013.01); *F05D 2300/603* (2013.01); *Y02T 50/672* (2013.01); *Y10T 29/49323* (2015.01)

(58) Field of Classification Search
CPC . F01D 9/04; F01D 9/044; F01D 9/042; F01D 9/041; F01D 25/24; F01D 25/246; F01D 25/243; F01D 5/282; Y02T 50/672; F04D 29/54; F04D 29/541; F04D 29/542; F04D 29/522; F04D 29/644; F04D 29/083; F05D 2230/60; Y10T 29/49323
See application file for complete search history.

(56) References Cited

U.S. PATENT DOCUMENTS

| | | | | |
|---|---|---|---|---|
| 2,995,294 A | * | 8/1961 | Warnken | F01D 9/042 415/209.2 |
| 3,997,280 A | * | 12/1976 | Germain | F01D 9/042 415/189 |
| 4,014,627 A | * | 3/1977 | Heurteux | F01D 9/042 415/189 |
| 4,940,386 A | * | 7/1990 | Feuvrier | F01D 9/04 415/189 |
| 5,083,900 A | * | 1/1992 | Carletti | F01D 9/042 415/191 |

(Continued)

*Primary Examiner* — Peter J Bertheaud
(74) *Attorney, Agent, or Firm* — Dority & Manning, P.A.

(57) ABSTRACT

A containment assembly for use in a turbine engine includes a fan case formed from a composite material. The fan case includes a forward end, an aft end, and an opening defined through the fan case between the forward and aft ends. The containment assembly further includes a structural attachment member formed from a metallic material and coupled to the fan case. The structural attachment member is positioned within the opening in the fan case and is configured to receive at least one fastener to couple a component to the structural attachment member.

8 Claims, 11 Drawing Sheets

(56) References Cited

U.S. PATENT DOCUMENTS

| | | | |
|---|---|---|---|
| 5,431,532 A | 7/1995 | Humke et al. | |
| 5,524,847 A | 6/1996 | Brodell et al. | |
| 5,823,739 A | 10/1998 | Van Duyn | |
| 6,053,696 A | 4/2000 | Roberts | |
| 6,305,899 B1 | 10/2001 | Saunders | |
| 6,543,995 B1 * | 4/2003 | Honda | F01D 9/041 415/189 |
| 6,814,541 B2 | 11/2004 | Evans et al. | |
| 7,246,990 B2 | 7/2007 | Xie et al. | |
| 7,914,256 B2 | 3/2011 | Xie et al. | |
| 8,092,169 B2 | 1/2012 | Cloft et al. | |
| 8,672,609 B2 * | 3/2014 | Lussier | F01D 21/045 415/197 |
| 8,876,042 B2 | 11/2014 | LaChapelle et al. | |
| 9,032,706 B2 | 5/2015 | Marshall | |
| 9,470,243 B2 * | 10/2016 | Ishigure | F01D 5/282 |
| 2009/0155044 A1 | 6/2009 | Xie et al. | |
| 2009/0189014 A1 | 7/2009 | Balk | |
| 2012/0099981 A1 | 4/2012 | Verseux et al. | |
| 2014/0003923 A1 | 1/2014 | Finnigan et al. | |
| 2015/0345320 A1 | 12/2015 | Webb | |
| 2016/0245308 A1 * | 8/2016 | Robertson | F01D 25/243 |

* cited by examiner

TURBINE ENGINE CONTAINMENT ASSEMBLY AND METHOD FOR MANUFACTURING THE SAME

BACKGROUND

The present disclosure relates generally to turbine engines and, more specifically, to a turbine engine with a rotor section containment assembly having a structural attachment member to strengthen components of the assembly.

At least some known gas turbine engines, such as aircraft engines, include a core engine, a fan assembly to supply air to the core engine, and a containment assembly that extends circumferentially about the core engine and the fan assembly. Known gas turbine engines include a containment assembly that includes a two-piece fan casing: a forward casing formed from composite materials and circumscribing the fan assembly; and an aft casing formed from a metallic material and circumscribing the outlet guide vane and the core engine. The metallic aft casing provides a durable structure for coupling to an engine mount and the outlet guide vane, which can withstand impact from within the turbine engine, such as during an unexpected blade-out condition. However, the metallic aft casing increases the overall weight of the fan casing, and the difficulty and time associated with the assembly of the forward and aft casings increase the overall manufacturing costs.

BRIEF DESCRIPTION

In one aspect, a containment assembly for use in a turbine engine is provided. The containment assembly includes a fan case formed from a composite material. The fan case includes a forward end, an aft end, and an opening defined through the fan case between the forward and aft ends. The containment assembly further includes a structural attachment member formed from a metallic material and coupled to the fan case. The structural attachment member is positioned within the opening in the fan case and is configured to receive at least one fastener to couple a component to the structural attachment member.

In one aspect of the disclosure, which may include at least a portion of the subject matter of any of the preceding and/or following examples and aspects, the fan case includes a first flange, and the structural attachment member includes a second flange aligned with the first flange. A seam is defined between the aligned first and second flanges.

In one aspect of the disclosure, which may include at least a portion of the subject matter of any of the preceding and/or following examples and aspects, the containment assembly further includes a stiffener coupled to both the first flange and to the second flange such that the stiffener extends across the seam.

In one aspect of the disclosure, which may include at least a portion of the subject matter of any of the preceding and/or following examples and aspects, the stiffener includes a plate coupled to both the first flange and to the second flange with a plurality of fasteners.

In one aspect of the disclosure, which may include at least a portion of the subject matter of any of the preceding and/or following examples and aspects, the structural attachment member includes a first lip extending about a perimeter of the structural attachment member, and the fan case includes a second lip extending about a perimeter of the opening. The first lip is coupled to the second lip to form a joint about the perimeter of the structural attachment member.

In one aspect of the disclosure, which may include at least a portion of the subject matter of any of the preceding and/or following examples and aspects, the first lip and the second lip are tapered such that a thickness of the joint is substantially similar to a thickness of the structural attachment member.

In one aspect of the disclosure, which may include at least a portion of the subject matter of any of the preceding and/or following examples and aspects, the second lip includes a first thickness, and the first lip includes a second thickness smaller than the first thickness.

In one aspect of the disclosure, which may include at least a portion of the subject matter of any of the preceding and/or following examples and aspects, the first material includes a composite material, and the second material includes a metallic material.

In another aspect, a turbine engine is provided. The turbine engine includes an outlet guide vane and a fan case positioned radially outward from the outlet guide vane. The fan case includes a forward end, an aft end, and an opening defined through the fan case between the forward end and the aft end. The turbine engine also includes a structural attachment member coupled to the fan case. The structural attachment member is positioned within the opening and is also coupled to the outlet guide vane with at least one fastener.

In one aspect of the disclosure, which may include at least a portion of the subject matter of any of the preceding and/or following examples and aspects, the fan case is formed from a composite material, and the structural attachment member is formed from a metallic material.

In one aspect of the disclosure, which may include at least a portion of the subject matter of any of the preceding and/or following examples and aspects, the structural attachment member extends circumferentially within a range of 20 degrees to 50 degrees about the fan case.

In one aspect of the disclosure, which may include at least a portion of the subject matter of any of the preceding and/or following examples and aspects, the fan case includes a first flange, and the structural attachment member includes a second flange aligned with the first flange. A seam is defined between the aligned first and second flanges.

In one aspect of the disclosure, which may include at least a portion of the subject matter of any of the preceding and/or following examples and aspects, the turbine engine further includes a stiffener coupled to both the first flange and to the second flange such that the stiffener extends across the seam. The stiffener includes a U-shaped coupling coupled to both a forward side and an aft side of the first and the second flanges.

In one aspect of the disclosure, which may include at least a portion of the subject matter of any of the preceding and/or following examples and aspects, the fan case includes a V-groove at the aft end. The V-groove is integrally formed with fan case from a composite material.

In yet another aspect, a method of forming a containment assembly for use in a turbine engine is provided. The method includes forming a fan case from a composite material and machining an opening in the fan case. The method also includes forming a structural attachment member from a metallic material and coupling the structural attachment member to the fan case such that structural attachment member is positioned within the opening. The method further includes coupling a component to the structural attachment member using at least one fastener.

In one aspect of the disclosure, which may include at least a portion of the subject matter of any of the preceding and/or following examples and aspects, machining the opening includes machining the opening to extend circumferentially about the fan case within a range of 20 degrees to 50 degrees.

In one aspect of the disclosure, which may include at least a portion of the subject matter of any of the preceding and/or following examples and aspects, coupling the structural attachment member to the fan case further includes: drilling a plurality of apertures in the fan case and in the structural attachment member, and inserting a plurality of fasteners through the plurality of apertures to couple the fan case to the structural attachment member.

In one aspect of the disclosure, which may include at least a portion of the subject matter of any of the preceding and/or following examples and aspects, coupling the structural attachment member to the fan case further includes coupling a stiffener across a seam formed by aligning a first flange of the fan case with a second flange of the structural attachment member.

In one aspect of the disclosure, which may include at least a portion of the subject matter of any of the preceding and/or following examples and aspects, coupling the stiffener includes coupling a plate to one of a forward side and an aft side of the aligned first and second flanges using a plurality of fasteners.

In one aspect of the disclosure, which may include at least a portion of the subject matter of any of the preceding and/or following examples and aspects, coupling the stiffener includes coupling a U-shaped coupling coupled to both a forward side and an aft side of the aligned first and second flanges such that the coupling straddles the first and second flanges.

DRAWINGS

These and other features, aspects, and advantages of the present disclosure will become better understood when the following detailed description is read with reference to the accompanying drawings in which like characters represent like parts throughout the drawings, wherein.

Figure 1:
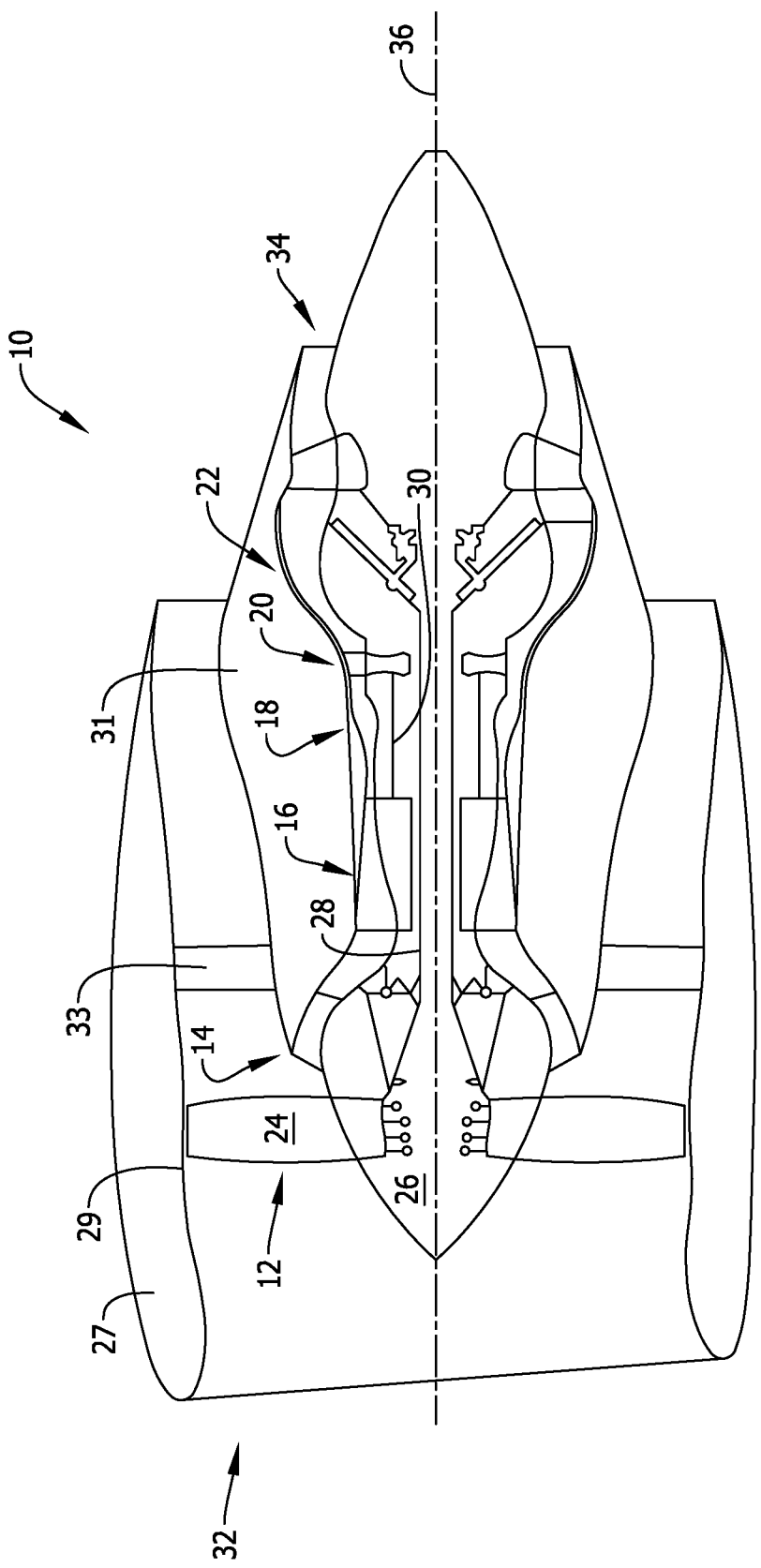
FIG. 1 is a schematic illustration of an exemplary turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to a rotor section containment assembly having a structural attachment member to strengthen components of the assembly. More specifically, the containment assembly described herein includes a fan case formed from a composite material and a structural attachment member formed from a metallic material and coupled to the fan case. The fan case includes a forward end, an aft end, and an opening defined between the forward and aft ends. The structural attachment member is positioned within the opening in the fan case and is also coupled to an outlet guide vane and an engine mounting structure of the turbine engine. The design features include a lightweight composite fan case to meet a majority of strength requirements for the containment assembly, and a metallic structural attachment member to provide a section of increased strength with a forward mount and corresponding connections for coupling to the engine mounting structure and the outlet guide vane without a large increase in the overall weight of the containment assembly.

While the following embodiments are described in the context of a turbofan engine, it should be understood that the systems and methods described herein are also applicable to turboprop engines, turboshaft engines, turbojet engines, and ground-based turbine engines, for example.

FIG. 1 is a schematic diagram of an exemplary turbine engine 10 including a fan assembly 12, a low-pressure or booster compressor assembly 14, a high-pressure compressor assembly 16, and a combustor assembly 18. Fan assembly 12, booster compressor assembly 14, high-pressure compressor assembly 16, and combustor assembly 18 are coupled in flow communication. Turbine engine 10 also includes a high-pressure turbine assembly 20 coupled in flow communication with combustor assembly 18 and a low-pressure turbine assembly 22. Fan assembly 12 includes an array of fan blades 24 extending radially outward from a rotor disk 26 toward a nacelle 27 that includes a fan case 29. A turbine case 31 extends circumferentially around low-pressure or booster compressor assembly 14, high-pressure compressor assembly 16, combustor assembly 18, high-pressure turbine assembly 20, and low-pressure turbine assembly 22. Turbine engine also includes an outlet guide vane 33 positioned aft of fan assembly 12 and extending from turbine case 31 to fan case 29. Low-pressure turbine assembly 22 is coupled to fan assembly 12 and booster compressor assembly 14 through a first drive shaft 28, and high-pressure turbine assembly 20 is coupled to high-pressure compressor assembly 16 through a second drive shaft 30. Turbine engine 10 has an intake 32 and an exhaust 34. Turbine engine 10 further includes a centerline 36 about which fan assembly 12, booster compressor assembly 14, high-pressure compressor assembly 16, and turbine assemblies 20 and 22 rotate.

In operation, air entering turbine engine 10 through intake 32 is channeled through fan assembly 12 towards booster compressor assembly 14. Compressed air is discharged from booster compressor assembly 14 towards high-pressure compressor assembly 16. Highly compressed air is channeled from high-pressure compressor assembly 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbine engine 10 via exhaust 34.

Figure 2:
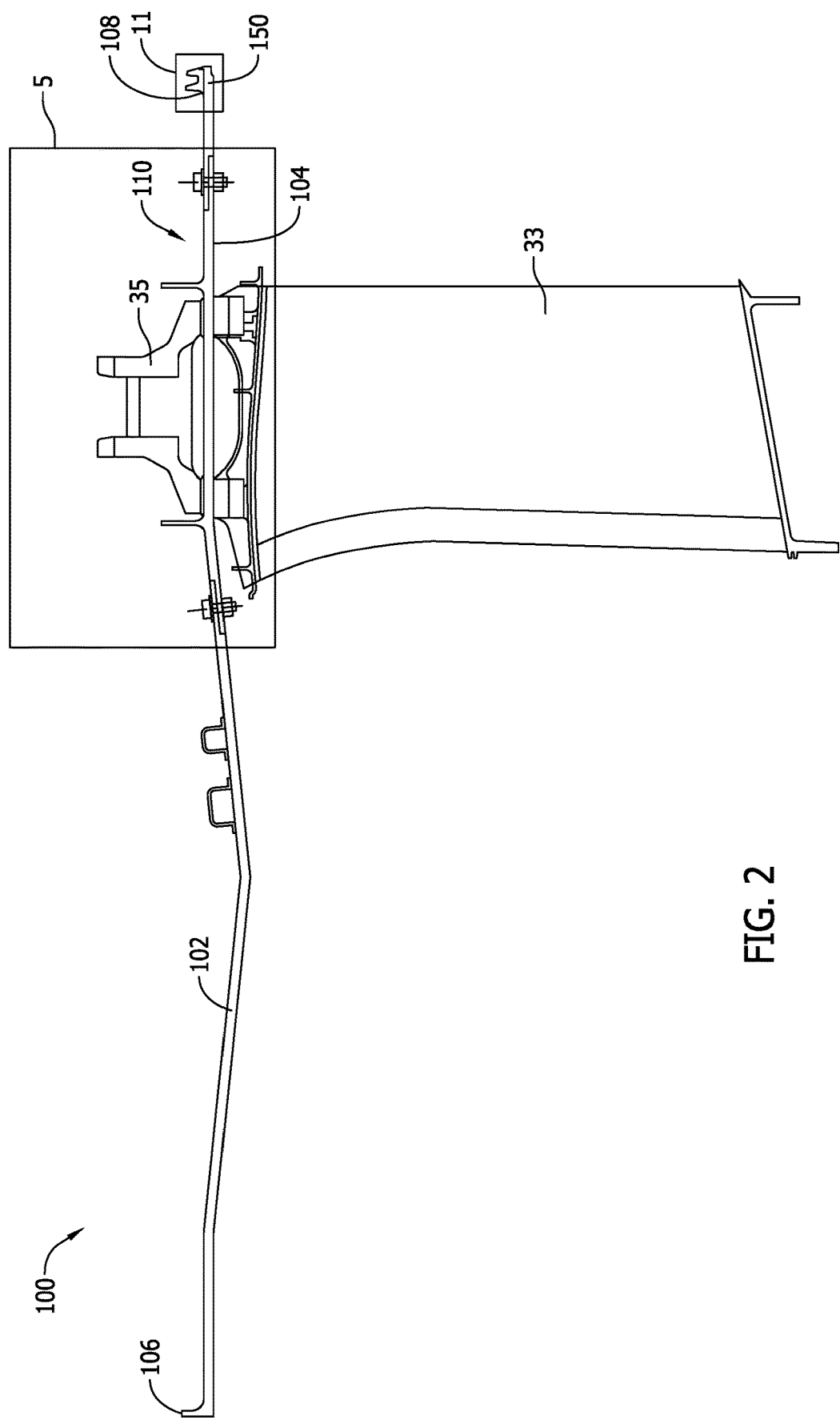
FIG. 2 is a cross-sectional illustration of an exemplary containment assembly that may be used in the turbine engine shown in FIG. 1.
Figure 3:
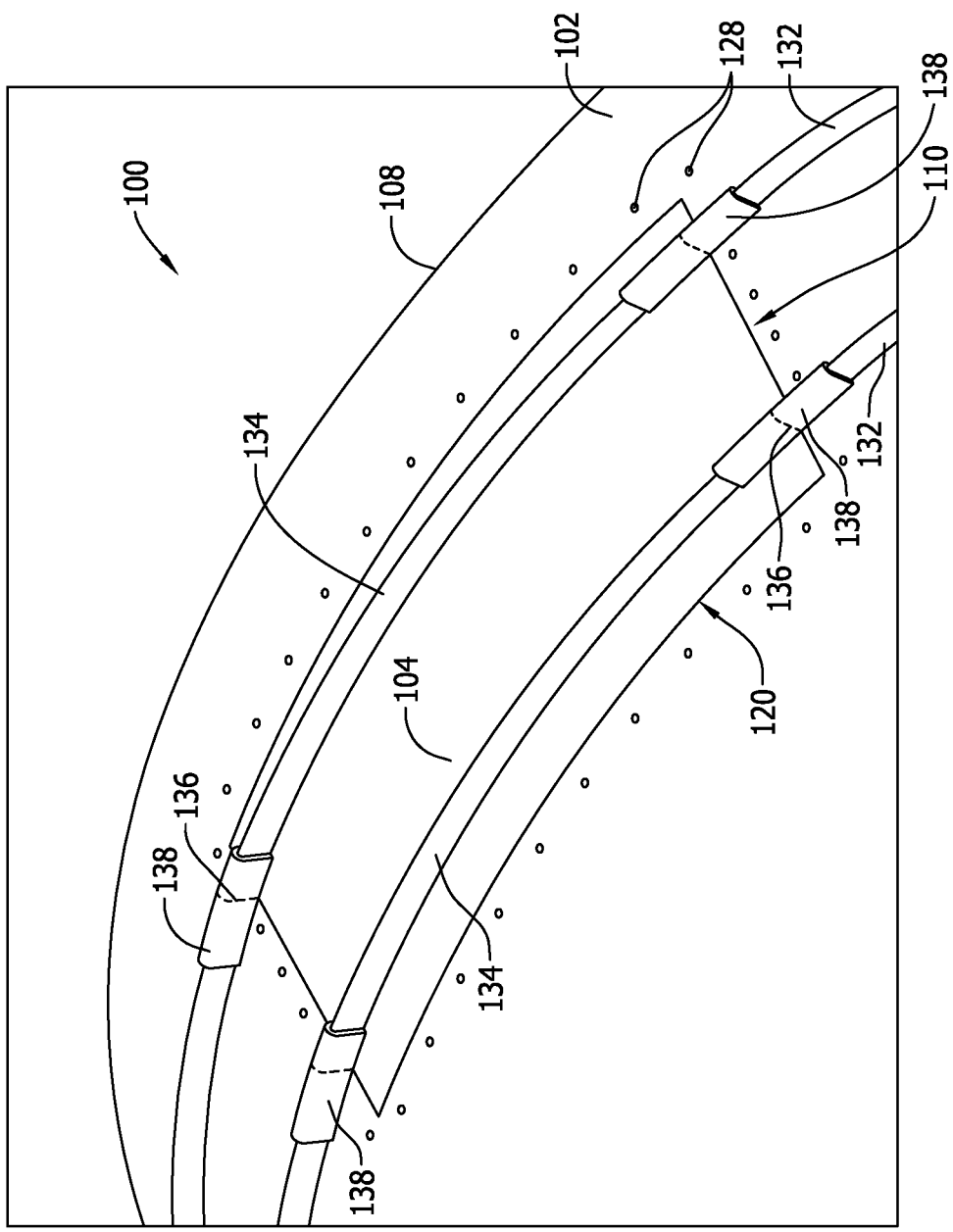
FIG. 3 is a perspective illustration of the containment assembly shown in FIG. 2 illustrating an exemplary fan case and an exemplary structural attachment member.
Figure 4:
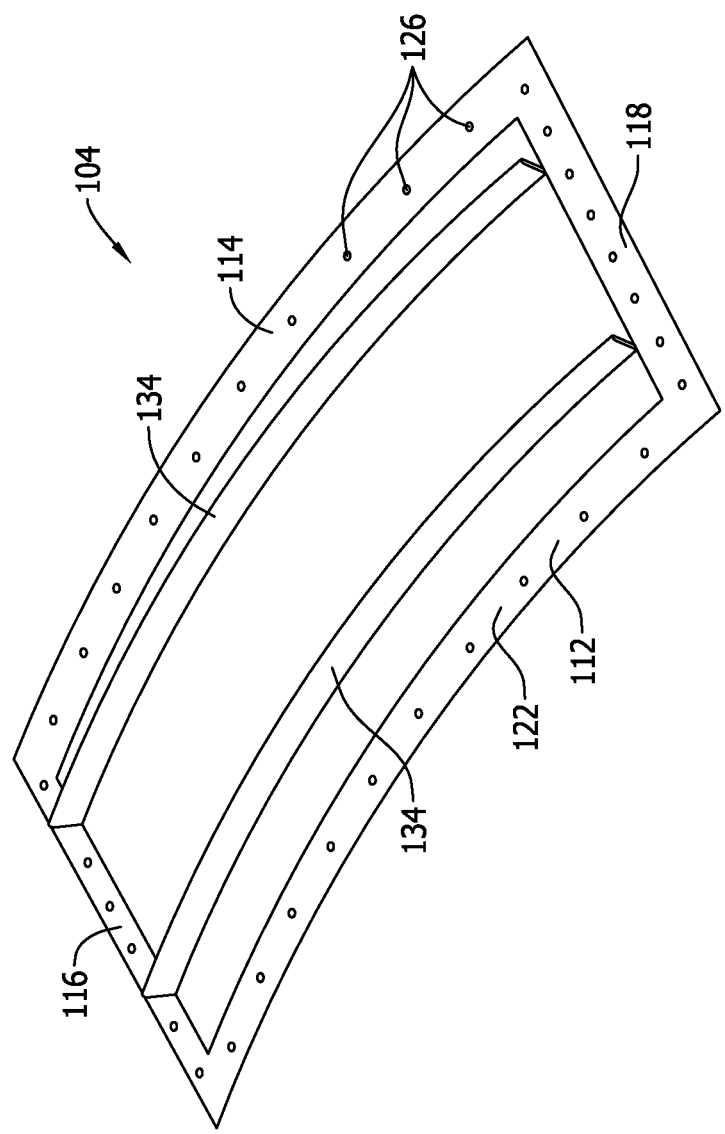
FIG. 4 is a perspective illustration of the structural attachment member shown in FIG. 3.
Figure 5:
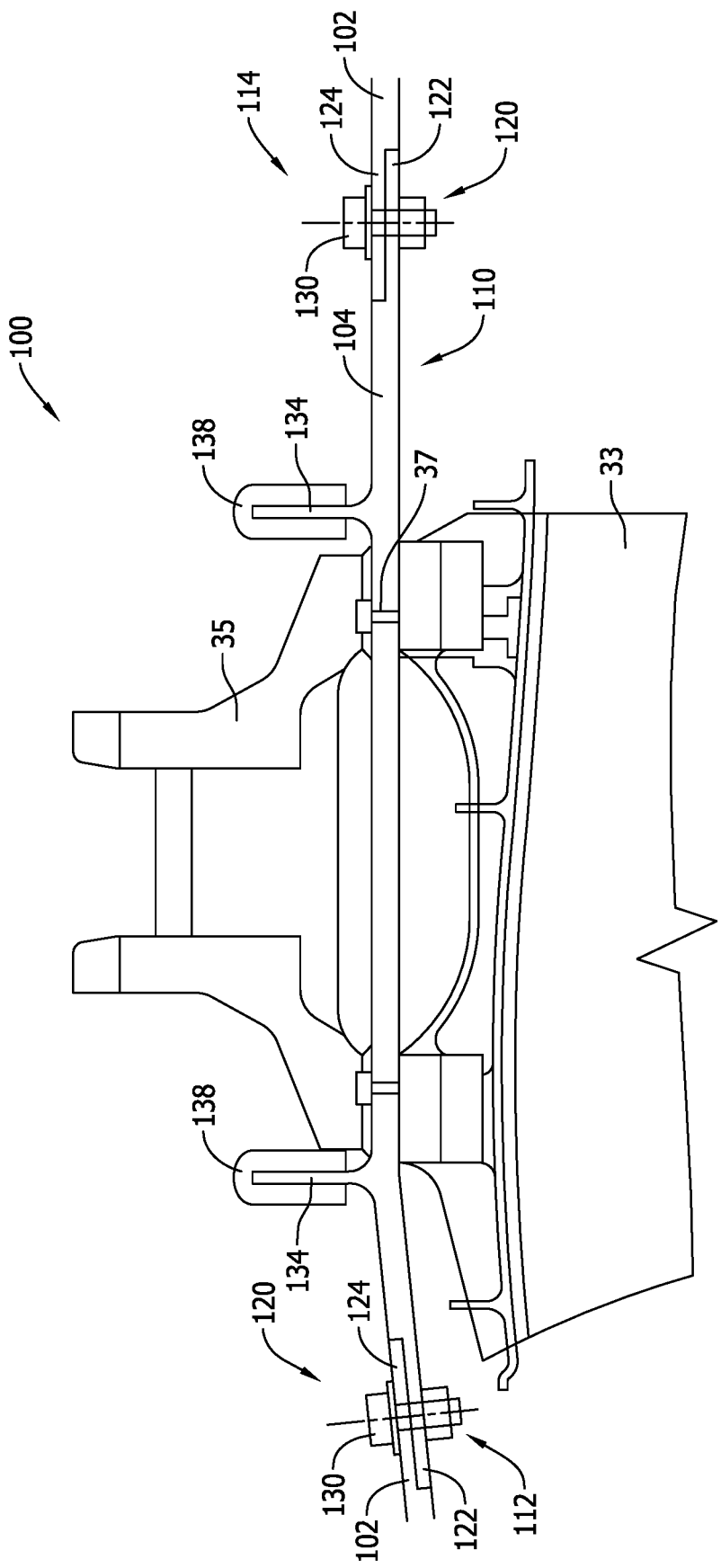
FIG. 5 is a cross-sectional illustration of a portion of the containment assembly shown in FIG. 2 taken along Area 5, illustrating a first exemplary embodiment of a stiffener of the containment assembly shown in FIG. 2.

FIG. 2 is a cross-sectional illustration of an exemplary containment assembly 100 that may be used in turbine engine 10 (shown in FIG. 1). FIG. 3 is a perspective illustration of containment assembly 100 including an exemplary structural attachment member 104, and fan case 29 (shown in FIG. 1) embodied as an exemplary fan case 102. FIG. 4 is a perspective illustration of structural attachment member 104 with fan case 102 removed for clarity. FIG. 5 is a cross-sectional illustration of a portion of containment assembly 100 taken along Area 5 (shown in FIG. 2).

In the exemplary embodiment, containment assembly 100 includes annular fan case 102 and structural attachment member 104. Fan case 102 includes a forward end 106 and an opposing aft end 108. Fan case 102 further includes an opening 110 defined therethrough between ends 106 and 108. Opening 110 is a through-hole and is positioned proximate aft end 108 of fan case 102. As shown in FIG. 2, opening 110 extends only a partial axial distance between ends 106 and 108. More specifically, opening 110 is axially aligned with outlet guide vane 33 and includes an axial length only slightly longer than the axial length of outlet guide vane 33.

In the exemplary embodiment, structural attachment member 104 is an arcuate segment coupled to fan case 102, and, more specifically, structural attachment member 104 is positioned within opening 110 of fan case 102. As shown in FIG. 2, structural attachment member 104 is also coupled to outlet guide vane 33 and to an engine mounting structure 35 such that structural attachment member 104 is positioned radially between outlet guide vane 33 and mounting structure 35 (mounting structure 35 is omitted from FIGS. 3 and 4 for clarity). In such a configuration, structural attachment member 104 is configured to receive a plurality of fasteners 37 to couple outlet guide vane 33 and mounting structure 35 to structural attachment member 104. In the exemplary embodiment, structural attachment member 104 is fabricated from a first material and fan case 102 is fabricated from second material that is different from the first material of structural attachment member 104. More specifically, structural attachment member 104 is fabricated from a metallic material, such as but not limited to, aluminum or titanium, and fan case 102 is fabricated from a composite material, such as but not limited to, a carbon fiber reinforced polymer (CFRP) material or a glass fiber reinforced composite (GFRP). As such, as described herein, composite fan case 102 provides a lightweight structure to meet a majority of strength requirements for containment assembly 100, and metallic structural attachment member 104 provides a section of increased strength to which outlet guide vane 33 and mounting structure 35 are configured to couple, without a large increase in the overall weight of containment assembly 100.

As best shown in FIG. 4, structural attachment member 104 includes a forward edge 112, an opposing aft edge 114, a first circumferential edge 116, and an opposing second circumferential edge 118. Circumferential edges 116 and 118 define a circumferential length of structural attachment member 104. In the exemplary embodiment, structural attachment member 104 extends circumferentially within a range of approximately 20 degrees to approximately 50 degrees about the circumference of fan case 102. In certain embodiments, structural attachment member 104 extends circumferentially approximately 30 degrees about the circumference of fan case 102. Generally, structural attachment member 104 extends any circumferential arc length about fan case 102 that facilitates operation of containment assembly 100 as described herein.

In the exemplary embodiment, edges 112, 114, 116, and 118 are coupled to an inner surface of fan case 102, as described below in further detail, to form a joint 120 extending about a perimeter of structural attachment member 104. More specifically, structural attachment member 104 includes a lip 122 extending about the perimeter of structural attachment member 104 along edges 112, 114, 116, and 118, and fan case 102 includes a lip 124 extending about a perimeter of opening 110.

Figure 8:
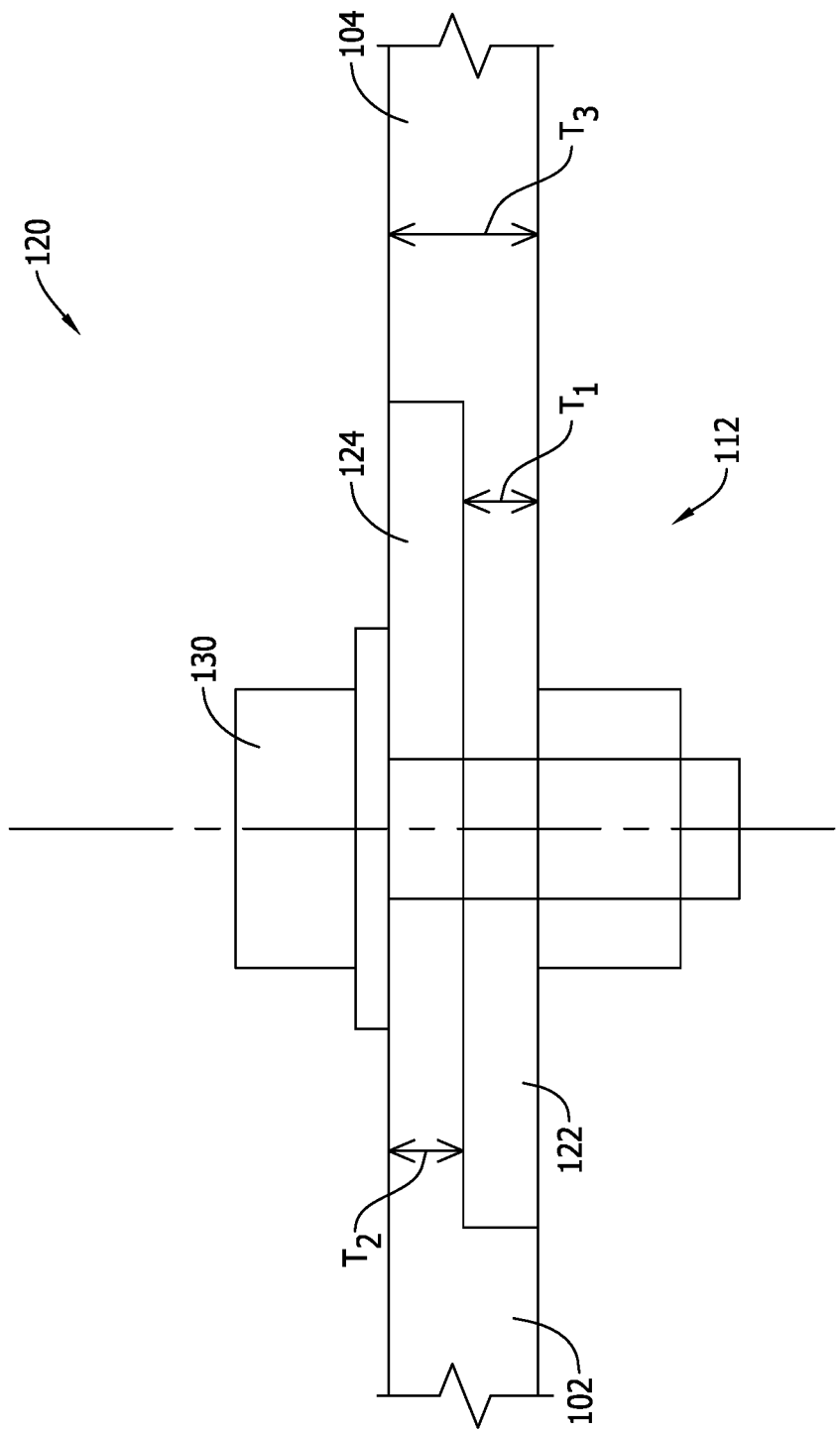
FIG. 8 is a cross-sectional illustration of a first exemplary embodiment of a joint of the containment assembly shown in FIG. 2.

As best shown in FIGS. 5 and 8, lip 122 is coupled to lip 124 to form joint 120 about the perimeter of structural attachment member 104. In one implementation, joint 120 is a lap joint wherein lip 122 includes a first constant thickness T1 and lip 124 includes a second constant thickness T2 that is substantially similar to first thickness T1. As shown in FIG. 8, the thickness of joint 120 is substantially similar to a thickness T3 of structural attachment member 104 proximate lip 122 and of fan case 102 proximate lip 124.

In the exemplary embodiment, lip 122 of structural attachment member 104 includes a plurality of apertures 126 (shown in FIG. 4) and lip 124 of fan case 102 includes a plurality of apertures 128 (shown in FIG. 3) such that each structural attachment member aperture 126 is aligned with a corresponding fan case aperture 128. Aligned apertures 126 and 128 receive a fastener 130 therethrough to couple structural attachment member 104 to fan case 102, and more specifically, to couple structural attachment member lip 122 to fan case lip 124. In one embodiment, fasteners 130 are removable such that structural attachment member 104 is removably coupled to fan case 102. The ability to remove structural attachment member 104 from fan case 102 enables maintenance and/or replacement of structural attachment member 104 and/or outlet guide vane 33.

Figure 9:
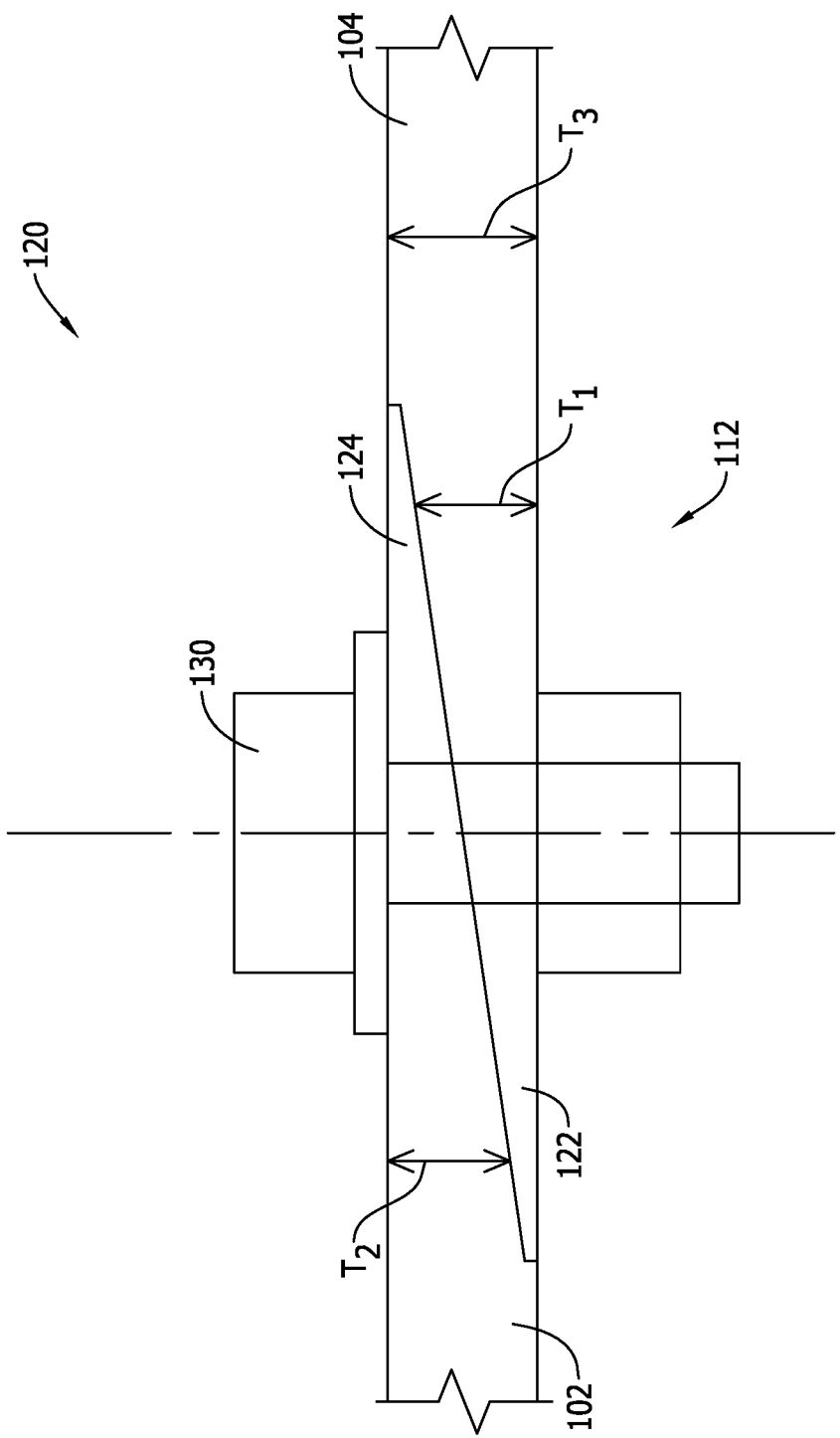
FIG. 9 is a cross-sectional illustration of a second exemplary embodiment of a joint of the containment assembly shown in FIG. 2.

In another embodiment, as shown in FIG. 9, joint 120 is a scarf joint wherein lip 122 includes a first tapered thickness T1 and lip 124 includes a second tapered thickness T2. As shown in FIG. 9, the combined thicknesses T1 and T2 of lips 122 and 124 at each point along joint 120 are substantially similar to thickness T3 of structural attachment member 104 proximate lip 122 and of fan case 102 proximate lip 124.

Figure 10:
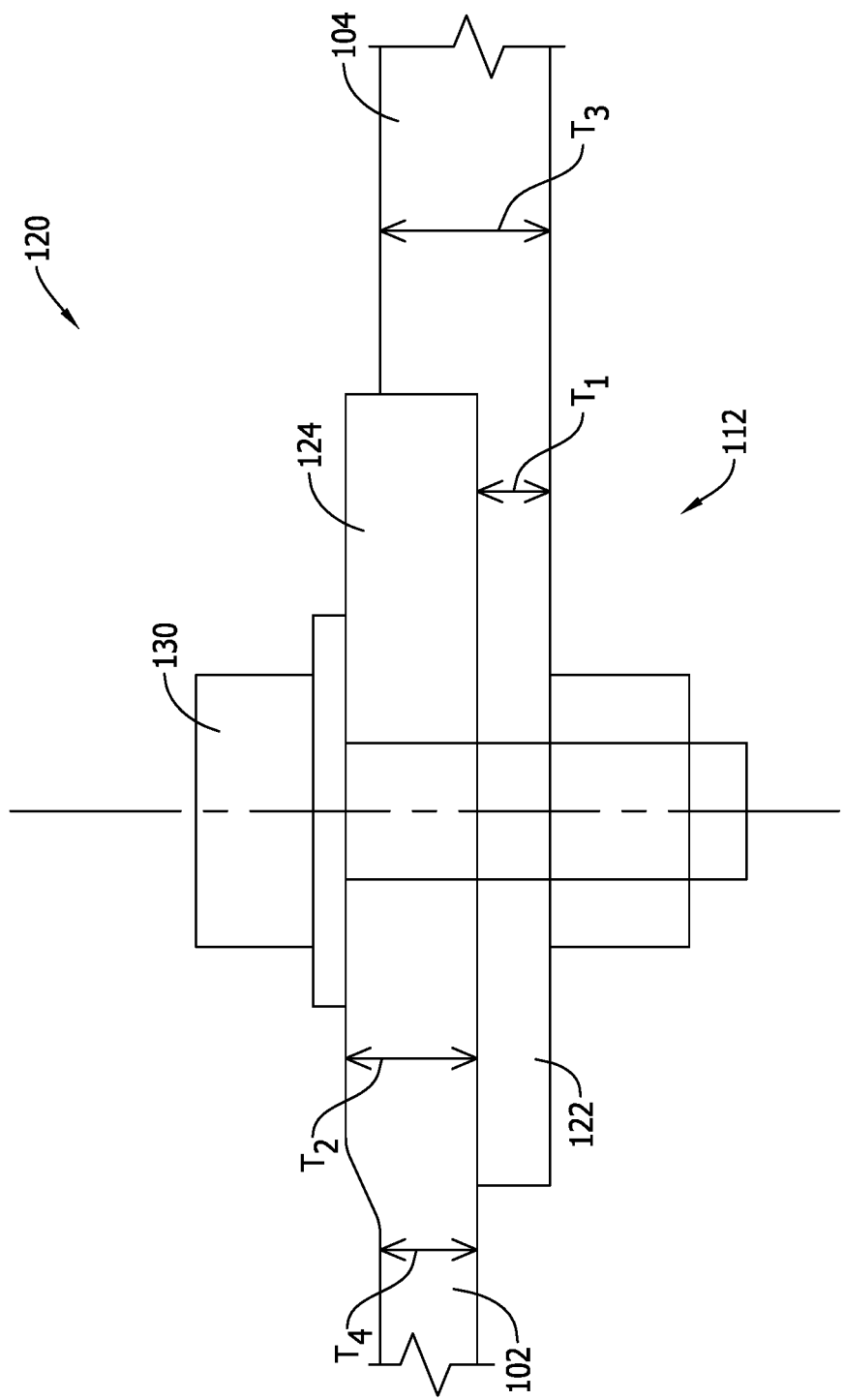
FIG. 10 is a cross-sectional illustration of a third exemplary embodiment of a joint of the containment assembly shown in FIG. 2.

In yet another embodiment, as shown in FIG. 10, joint 120 is a built-up joint where lip 122 includes a first constant thickness T1 and lip 124 includes a second constant thickness T2 that is larger than first thickness T1. As shown in FIG. 10, the combined thicknesses T1 and T2 of lips 122 and 124 along joint 120 is larger than thickness T3 of structural attachment member 104 proximate lip 122 and of a fourth thickness T4 of fan case 102 proximate lip 124. Furthermore, second thickness T2 is larger than fourth thickness T4 of fan case 102 proximate lip 124. Generally, lips 122 and 124, fan case 102, and structural attachment member 104 may include any thicknesses that facilitate operation of containment assembly 100 as described herein.

Returning to FIGS. 3-5, in the exemplary embodiment, fan case 102 also includes a first pair of fan case flanges 132 that extend circumferentially around fan case 102. Similarly, structural attachment member 104 includes a second pair of structural attachment member flanges 134 that extend between circumferential ends 116 and 118. As shown in FIG. 3, fan case flanges 132 are aligned with structural attachment member flanges 134 such that a seam 136 is defined where flanges 132 and 134 meet. In the exemplary embodiment, containment assembly 100 also includes a first embodiment of a stiffener, designated stiffener 138, coupled to each fan case flange 132 and corresponding aligned structural attachment member flange 134 such that a respective stiffener 138 extends across each seam 136. As shown in FIGS. 3 and 5, in one embodiment, stiffener 138 is a U-shaped coupling that fits over flanges 132 and 134 at seam 136 such that stiffener 138 straddles flanges 132 and 134 and contacts both a forward side and an aft side of flanges 132 and 134.

Figure 6:
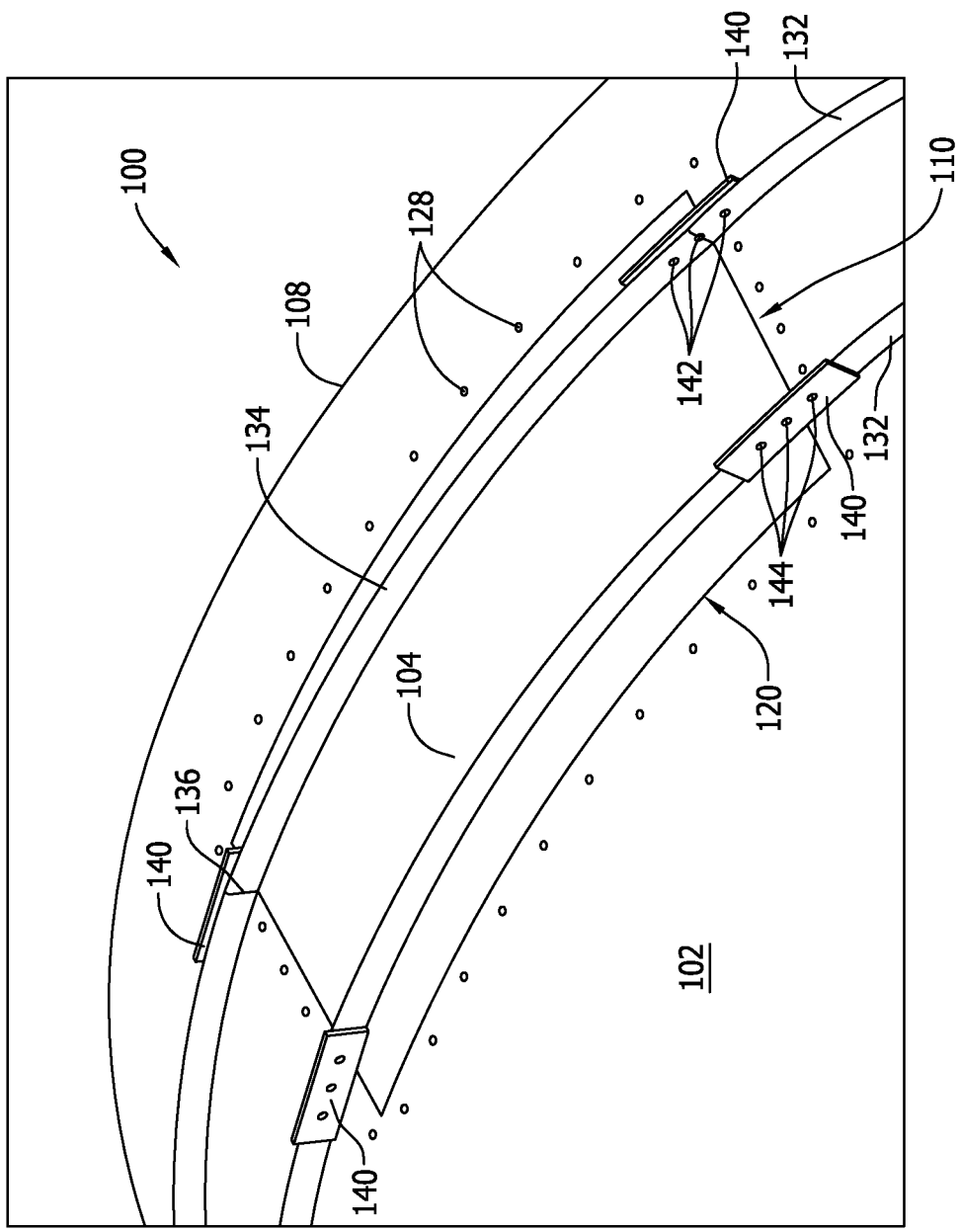
FIG. 6 is a perspective illustration of the containment assembly shown in FIG. 2, illustrating a second exemplary embodiment of a stiffener of the containment assembly shown in FIG. 2.
Figure 7:
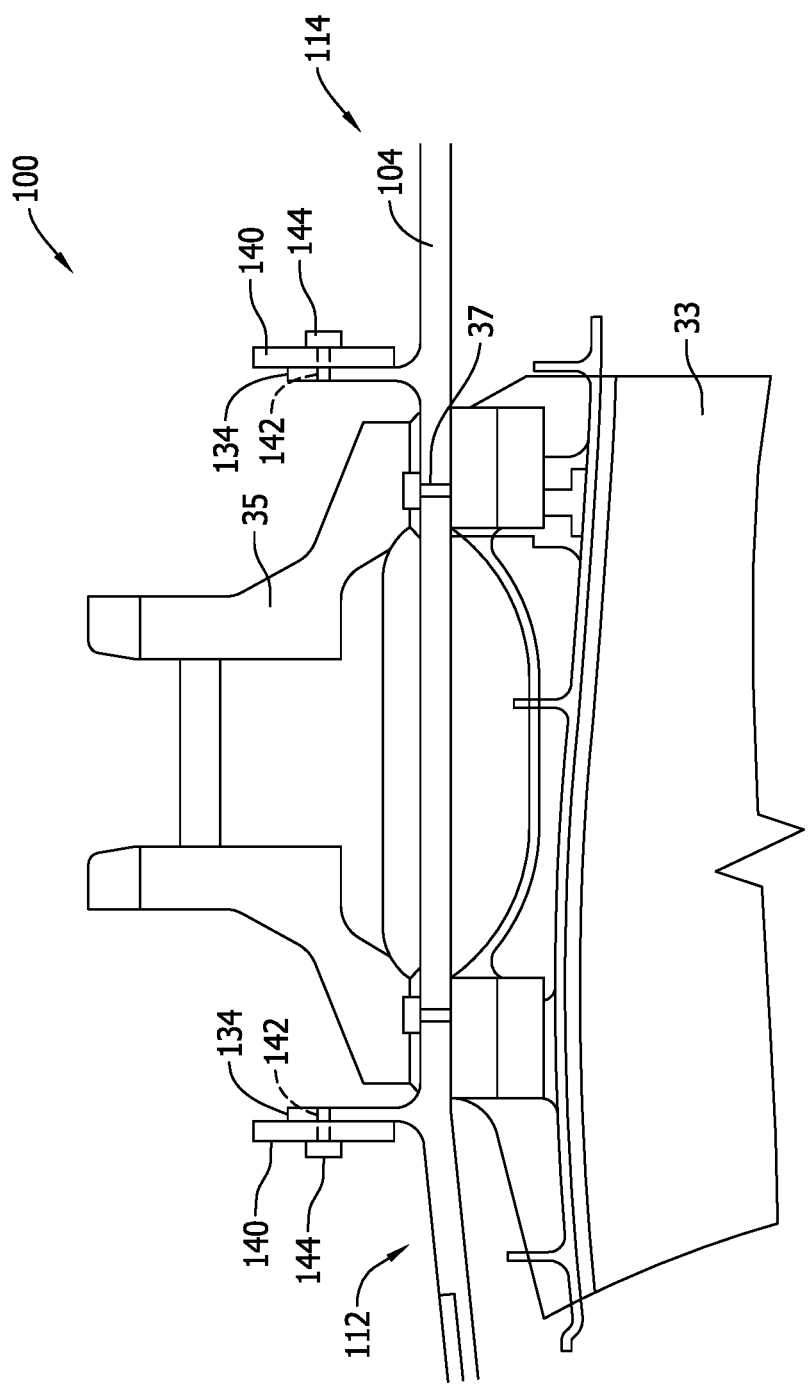
FIG. 7 is a cross-sectional illustration of a portion of the containment assembly shown in FIG. 2 taken along Area 5, illustrating the exemplary stiffener shown in FIG. 6.

FIG. 6 is a perspective illustration of containment assembly 100 illustrating a second embodiment of a stiffener, designated stiffener 140, coupled to fan case 102 and structural attachment member 104. FIG. 7 is a cross-sectional illustration of a portion of containment assembly 100 illustrating stiffener 140. Mounting structure 35 is omitted from FIG. 6 for clarity. As shown in FIGS. 6 and 7, stiffener 140 includes a respective plate coupled at each seam 136 of flanges 132 and 134. More specifically, stiffener 140 is coupled to a forward side of the forward flanges 132 and 134 and to an aft side of aft flanges 132 and 134. As such, seams 136 are at least partially exposed on an aft side of forward flanges 132 and 134 and on a forward side of aft flanges 132 and 134. Alternatively, plate stiffener 140 is coupled to an aft side of the forward flanges 132 and 134 and to a forward side of aft flanges 132 and 134. Generally, plate stiffeners 140 are coupled to either side of flanges 132 and 134 that facilitates operation of assembly 100 as described herein. Apertures 142 are formed in each of plate stiffeners 140 and flanges 132 and 134 to enable the use of a plurality of fasteners 144 to couple stiffeners 140 to flanges 132 and 134.

Figure 11:
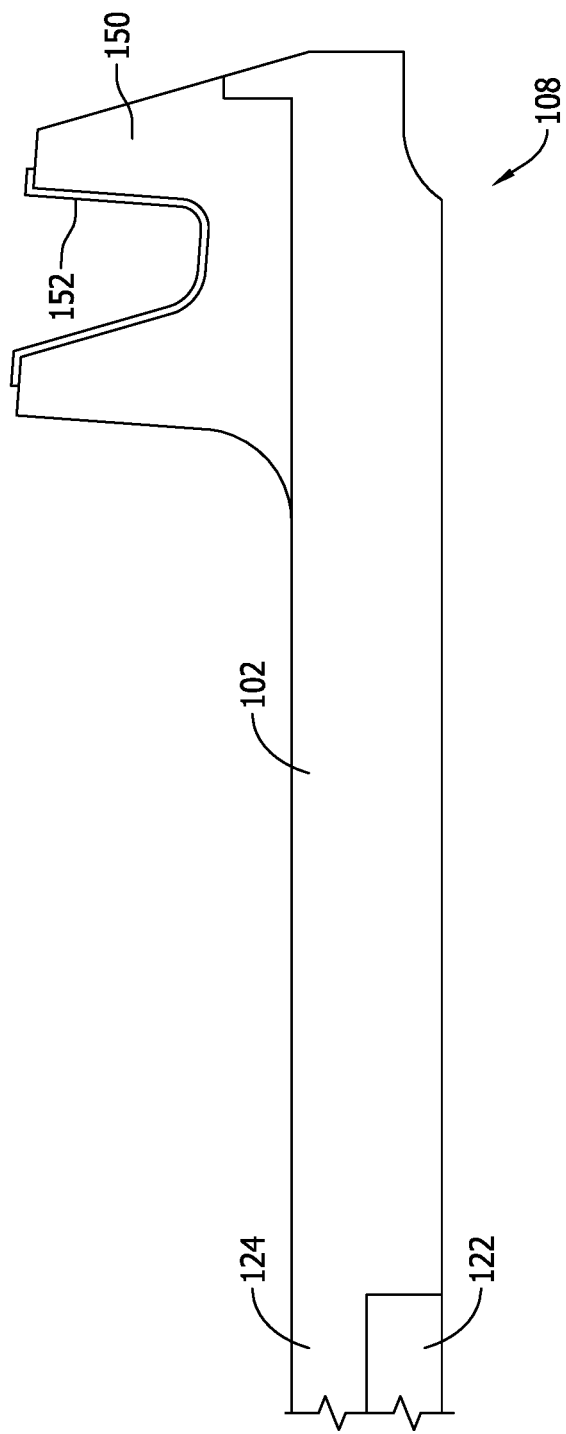
FIG. 11 is a cross-sectional illustration of a portion of the containment assembly shown in FIG. 2 taken along Area 11.

FIG. 11 is a cross-sectional illustration of a portion of containment assembly 100 taken along Area 11, shown in FIG. 2. In the exemplary embodiment, fan case 102 also includes a V-groove member 150 at aft end 108 of fan case 102. V-groove member 150 is integrally formed with fan case 102 from a plurality of bi-axial/tri-axial braided plies of composite material to increase strength, as described above. As shown in FIG. 11, V-groove member 150 includes a wear strip 152 coupled thereto. Wear strip 152 is formed from a braided composite material.

A method of forming containment assembly 100 is also disclosed herein. The method includes forming fan case 102 from a composite material and machining opening 110 into fan case 102. The machining step also includes machining opening 110 in fan case 102 such that opening 110 extends circumferentially within a range of approximately 20 degrees to approximately 50 degrees about the circumference of fan case 102. The method also includes forming structural attachment member 104 from a metallic material and coupling structural attachment member 104 to fan case 102 such that structural attachment member 104 is positioned within opening 110. The step of coupling structural attachment member 104 to fan case 102 includes drilling the plurality of apertures 126 and 128 in fan case 102 and in structural attachment member 104 and then inserting a plurality of fasteners 130 through the plurality of apertures 126 and 128 to couple fan case 102 to structural attachment member 104. The step of coupling structural attachment member 104 to fan case 102 also includes coupling one of stiffeners 138 or 140 across seam 136 formed by aligning first flange 132 of fan case 102 with second flange 134 of structural attachment member 104.

An exemplary technical effect of the assembly and methods described herein includes at least one of: (a) providing an improved stiffness of the containment assembly by using a uniform thickness of the aft and forward portions of the composite fan case; (b) providing a structural attachment member of increased strength with a forward mount and corresponding connections to which the outlet guide vane and engine mounting structure may be coupled, without a large increase in the overall weight of the containment assembly; (c) reducing the operating costs of the engine by providing an integrated composite fan case; and d) simplifying manufacturing processes and reducing the manufacturing costs by providing an integrated composite fan case.

Exemplary embodiments of a containment assembly for use with a turbine engine and related components are described above in detail. The assembly is not limited to the specific embodiments described herein, but rather, components of systems and/or steps of the methods may be utilized independently and separately from other components and/or steps described herein. For example, the configuration of components described herein may also be used in combination with other processes, and is not limited to practice with a fan section of a turbine engine. Rather, the exemplary embodiment can be implemented and utilized in connection with many applications where providing smooth load transition between components in an assembly is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A containment assembly for use with a turbine engine, said containment assembly comprising:
    a fan case formed from a first material and including a forward end and an aft end, wherein said fan case includes an opening defined through said fan case between said forward end and said aft end and a first flange;
    a structural attachment member coupled to said fan case, wherein said structural attachment member is positioned within said opening, and wherein said structural attachment member is formed from a second material different than the first material and is configured to receive at least one fastener to couple a component to said structural attachment member, and wherein said structural attachment member includes a second flange aligned with said first flange, wherein a seam is defined between said aligned first and second flanges; and
    a stiffener coupled to both said first flange and to said second flange such that said stiffener extends across said seam, wherein said stiffener includes a plate coupled to both said first flange and to said second flange with a plurality of fasteners.

2. The containment assembly in accordance with claim 1, wherein the first material includes a composite material and the second material includes a metallic material.

3. A containment assembly for use with a turbine engine, said containment assembly comprising:
    a fan case formed from a first material and including a forward end and an aft end, wherein said fan case includes an opening defined through said fan case between said forward end and said aft end; and
    a structural attachment member coupled to said fan case, wherein said structural attachment member is positioned within said opening, is formed from a second material different than the first material, is configured to receive at least one fastener to couple a component to said structural attachment member, and includes a first lip extending about a perimeter of said structural attachment member,
    wherein said fan case includes a second lip extending about a perimeter of said opening and coupled to said first lip to form a joint about the perimeter of said structural attachment member, and
    wherein said first lip and said second lip are tapered such that a thickness of said joint is substantially similar to a thickness of said structural attachment member.

4. The containment assembly in accordance with claim 3, wherein the first material includes a composite material and the second material includes a metallic material.

5. A turbine engine comprising:
    an outlet guide vane;
    a fan case positioned radially outward from said outlet guide vane, wherein said fan case includes a forward end, an aft end, a first flange, and an opening defined through said fan case between said forward end and said aft end;
    a structural attachment member coupled to said fan case, wherein said structural attachment member is positioned within said opening, wherein said structural attachment member is also coupled to said outlet guide vane with at least one fastener, and wherein said structural attachment member includes a second flange aligned with said first flange, wherein a seam is defined between said aligned first and second flanges; and
    a stiffener coupled to both said first flange and to said second flange such that said stiffener extends across said seam, wherein said stiffener includes a U-shaped coupling coupled to both a forward side and an aft side of said first and said second flanges.

6. The turbine engine in accordance with claim 5, wherein said fan case is formed from a composite material and said structural attachment member is formed from a metallic material.

7. The turbine engine in accordance with claim 5, wherein said structural attachment member extends circumferentially within a range of 20 degrees to 50 degrees about said fan case.

8. The turbine engine in accordance with claim 5, wherein said fan case includes a V-groove at said aft end, wherein said V-groove is integrally formed with said fan case from a composite material.

* * * * *